United States Patent
Ichihata

[15] 3,663,234
[45] May 16, 1972

[54] METHOD FOR PROCESSING A COMPOSITE FOOD OF FISH MEAT-BEAN CURDS AS AN INSTANT FOODSTUFF

[72] Inventor: Hitoshi Ichihata, Kannamimachi, Tagata-gun, Shizuoka-Prefecture, Japan

[73] Assignee: Morinaga Confectionery Co., Ltd., Tokyo, Japan

[22] Filed: Jan. 24, 1968

[21] Appl. No.: 700,011

[30] Foreign Application Priority Data

Jan. 27, 1967   Japan....................................42/5306

[52] U.S. Cl..........................................99/111, 99/17, 99/18, 99/98, 99/193, 99/195, 99/204, 99/209
[51] Int. Cl. .....................................................A23l 1/325
[58] Field of Search...................99/111, 14, 17, 18, 98, 209

[56] References Cited

UNITED STATES PATENTS

| | | | |
|---|---|---|---|
| 3,185,574 | 5/1965 | Gabby et al.............................. | 99/14 |
| 3,442,658 | 5/1969 | Okumura et al.......................... | 99/98 |

OTHER PUBLICATIONS

Markley, Soybeans and Soybean Products, Vol. 2, page 1000, 1951, Interscience Publishers, Inc. New York, N.Y.

*Primary Examiner*—A. Louis Monacell
*Assistant Examiner*—Robert M. Elliott
*Attorney*—Wenderoth, Lind & Ponack

[57] ABSTRACT

Method for processing a composite food of fish meat-soy curds as an instant foodstuff, wherein a homogeneous mixture of refined fish meat with 5.0 per cent or more of soy curds is molded, or a homogeneous coagulated substance that is resulted from adding a coagulating agent to the mixture of the said refined fish meat with 2.5 per cent or more of bean soup or the like, is molded, and then is subjected to conventional processing steps e.g. steam heating, refrigeration, recovery from refrigeration and drying, and then the molded substance is given a spongy structure and if necessary is fried with edible oil.

5 Claims, No Drawings

3,663,234

METHOD FOR PROCESSING A COMPOSITE FOOD OF FISH MEAT-BEAN CURDS AS AN INSTANT FOODSTUFF

DETAILED EXPLANATION FOR THE INVENTION

The present invention relates to a method for processing a composite food of fish meat-bean curds as an instant foodstuff.

The fish meat occupies 20 to 60 per cent of a fish body and contains 75 per cent of water content, 20 per cent of protein, 1.5 per cent of inorganic substance, 2 per cent of fat, and about 1 per cent of extract on the average.

Its protein does not only contain all indispensable amino acids e.g. valine, leucine, isoleucine, threonine, methionine, phenylalanine, triptaphan, and histidine or the like, but also glutamic acid and inosinic acid, having a delicious flavor and compared with butcher's meat, i.e. animal meat, it contains characteristically a small amount of connective tissue.

Further, as an inorganic component, it contains a larger amount of potassium, magnesium, calcium, phosphorus and iodine more than those in animal meat. As a fat component, it contains a large amount of higher unsaturated fatty acids and so-called fish oil odour is considered even a defect of fish meat.

Further, bean curds consist of protein (glycinine) which is contained in soybeans. In a production step of the present process, soybeans are immersed in water and then are ground and heated. Glycinine together with soluble salts contained therein, are transferred into the water. This is because glycinine increases the aqueous solubility of the other components thereby forming a bean soup.

A concentrated colloid solution of glycinine obtained above is added with a small amount of $Ca^{++}$, $Mg^{++}$ or the like and thereby colloid particles of above glycinine are condensed to a block state. This condensed, block colloid is put into a certain vessel and is coagulated and then "Soy-curds by a silk cloth" and "soy curds by a cotton bag" are directly produced. Further, the said colloid is poured into a porous box on which a cloth bag is fitted in the inner side, and an aqueous soluble substance in supernatent liquid is exhausted and is "partially dehydrated semi-soft-soy curds by a cotton cloth" are produced. Thus, soy curds produced by the above-mentioned process contain about 88 percent moisture, 6 percent protein, 3.5 percent fat and 2 percent or less carbohydrate and further about 1 percent of calcium and magnesium which originate from the employment of a coagulant.

Further, on the basis of dry material convension, it contains about 50 per cent protein and about 30 per cent fat.

On the other hand, as a means of preparing preservative food of fish meat, a paste food, a cooked and dry food, a salted food, a dry fish, a plain dry fish, a salt and soy pickled fish and a smoked fish are produced and furthermore, a dry fish flake and a ground food are produced, whereas as a means of preserving the soy curds, there is a process in which it is refrigerated and dried to produce sponge-like soybean curds resulting from refrigeration.

The present invention is to obtain an instant food, having particularly a favorable preservability, namely a composite food, having an entirely new taste which comprises a mixture of the above mentioned fish meat and soy curds and a homogeneously incorporated mixture of both flavors and tastes. Furthermore, the present invention produces a foodstuff which contains animal protein and vegetable protein and thereby, provides amino acids, methionine, lysine and threomine in which an agricultural foodstuff is most deficient. A necessary amount of nutritional elements are provided by the fish meat and a nutritiously superior food can be obtained from it.

In order to incorporate homogeneously fish meat and soy curds, an optional process is employed in the present invention. In the other words, the fish meat is obtained by a familiar meat collector i.e. by a rolling or stamping type or the like. This refined fish meat is appropriately dipped in water, containing a small amount of soluble salts and simultaneously, this fish meat is prevented from dehydration, and then, the said fish meat is ground. Otherwise the above refined fish meat is processed with a heat treatment and protein is thermally denatured and coagulated, and then, the said fish meat is ground. The fish meat processed through the above steps or this fish meat processed furthermore with a slight heat treatment is used and is blended with soy curds by appropriate number of steps, prior to coagulation of both substances. Soy curds which are made from raw soy beans or defatted soy bean and can be commercially obtained and may be directly used. Otherwise, bean soup (water content of about 88 to 98 per cent) or an aqueous solution (water content of about 93 to 97 per cent) of purified defatted soy bean powder (moisture content of about 3 to 10 per cent) are employed for above mixture.

The above ground fish meat and a fresh bean soup are mixed homogeneously and a conventional coagulating agent, e.g. calcium sulfate, magnesium chloride and glucono-δ-lactone is added in this resultant mixture and this mixture accumulates fiber of fish meat, as soy bean protein is coagulated. All substances can be uniformly coagulated, precipitated and moulded and, on the other hand, bean curds ground materials or bean soup materials which have minimum moisture content and a little hardness can be added to the refined raw fish meat in a mixing mould.

The moulding obtained above is processed with heat treatment and protein is gelled and then the said moulding is treated with a refrigeration, a recovery from refrigeration and a drying of dehydration or directly processed with a treatment of refrigerating drying. Furthermore, it may be fried in an edible oil.

Further, steam heat is a most simple means for the above heat treatment prior to the refrigeration, and besides the above, autoclave may be employed for this treatment. In the case of using steam heat, all cautions shall be particularly exercised, in order that a large amount of condensation does not cause collapse of mouldings.

Besides the above, a conventional process for producing marine paste products e.g. the use of ammonia, potassium bromide, condensed phosphate, and edible salt may be appropriately used in so far as porosity of finished product is not impaired. Then, as a refrigerating process a conventional means, such as a natural freezing and freezing by a refrigerator can be appropriately used. The drying, in succession to refrigeration, can be carried out by a conventional means, e.g. a continuous system dryer in chain belt type, having a countercurrent blower and a batchwise dryer in shelf type.

Further, refrigeration and drying may be simultaneously carried out by using a freeze dryer and as a drying means, and a high frequency inductive heating and infrared ray heating supersonic waves may be utilized for drying it.

As described above, the present invention comprises formation of a spongy, porous structure which results from freezing of soybean protein and also results in enlargement of drying surface area, whereby the drying of fish meat which has been hitherto regarded as very difficult is carried out in a very short time and also the finished produced can possess both the superior nature of fish meat and soy bean.

As the use of the finished product in the present invention, it can be simply cooked for an instant food and furthermore, it can be pulverized to be incorporated with biscuits, Japanese crackers (senbei) and crackers and thereby a high nutritive food can be obtained.

As a fish meat employable for the present invention, so-called fish meat which contains a small amount of fat and oil is suitably selected. Various anti-oxidants, e.g. propylene glycol solution such as BHA, BHT, NDGA or the like may be atomized in it for the purpose of preventing rancidity of fats and oils. Otherwise, as a subsidiary material, soy bean protein in the range of 10 to 30 per cent may be substituted by potatoes such as mush potato, corns and starch or the like. As a condiment and a flavoring spicery, edible salt sodium glutamate, Japanese pepper (Xanthoxylum piperitum), horseradish (Wasabia japonica Matsumura), Ginger (Zingiber officinale), Vanilla essence (Vanilla planifolia) and mustard (Brassica ceruna) may be employed and added in it.

Then, Examples are set forth below:

EXAMPLE 1

Epidermis and osseous parts were removed from a fresh cod (Gadus callarias) which contains about 80 per cent of moisture content and the meat was minced by a chopper. 500 parts of commercially sold soy-curds (about 90 per cent of moisture content) was added in 500 parts of above minced meat and those were well agitated and mixed and the resultant mixture was filled in an aluminum cylindrical container, in the size of about 5 cm diameter and about 2 cm height. The mixture in the above container was steamed in a casserole (steaming pan) at 100°C during 15 minutes and then was frozen in a refrigerating room at −22° C. during 10 hours. This mixture was recovered from the refrigeration and formed a spongy structure. This spongy mixture was dehydrated by a centrifugal hydroextractor until reducing the moisture content to about 65 per cent. Then, after blowing an air blast on it, it was dried by a batchwise dryer in shelf type at 45° C. during 6 hours and the objective was obtained.

EXAMPLE 2

Epidermis and osseous parts were removed from a fresh tuna (Thunnus thynnus) and its sliced meat in the size of about 10 cm × 10 cm × 3 cm was steamed in a casserole at 100° C. during 30 minutes. The said meat was crumpled in a cloth bag and then was minced by a chopper. Then, 30 parts of purified soy bean powder which was dissolved and dispersed in 470 parts of hot water was added into 500 parts of the minced meat and then 0.3 parts of glycono-δ-lactone was added in this resultant mixture. This mixture was slowly agitated and mixed, and by heating it at 90° C. during 60 minutes, it was coagulated so that the soy bean component may contain a meat component therein. This mixture was dehydrated by the process similar to that used in the production of soy curds to produce an adequate hardness and to reduce the mixture content to about 80 per cent. This dehydrated mixture was cut in an appropriate mould, and it was refrigerated, recovered from refrigeration, dehydrated and dried. Then, the objective was obtained.

What is claimed is:
1. Method for producing a spongy porous composite food of fish meat and soy curds which consists essentially of:
   a. moulding
      1. a homogeneous mixture of refined fish meat containing 5 percent or more of soy curds or
      2. a homogeneous coagulated substance resultant from the addition of a coagulating agent to a mixture of refined fish meat with i) 2.5 percent or more of bean soup or ii) an equivalent per cent of an aqueous solution of purified soybean protein.
   b. heating the molded mixture of (a);
   c. freezing the product of (b);
   d. recovering the product of c) from freezing;
   e. drying the product of (d).

2. A method according to claim 1 wherein the freezing and drying are carried out simultaneously in a freeze-dryer.

3. A method according to claim 1 wherein the resultant product is fried with edible oils.

4. A method according to claim 1 wherein the heating is with steam heat.

5. A method according to claim 1 wherein the heating is to about 90° C.

* * * * *